June 27, 1944.  A. SAROSSY  2,352,227
THREAD MILLING ASSEMBLY
Filed Sept. 25, 1942  2 Sheets-Sheet 1

INVENTOR.
ALBERT SAROSSY
BY
C. P. Goepel
ATTORNEY

June 27, 1944.  A. SAROSSY  2,352,227

THREAD MILLING ASSEMBLY

Filed Sept. 25, 1942  2 Sheets-Sheet 2

INVENTOR.
ALBERT SAROSSY
BY
C. P. Goepel
ATTORNEY

Patented June 27, 1944

2,352,227

UNITED STATES PATENT OFFICE 2,352,227

THREAD MILLING ASSEMBLY

Albert Sarossy, West Orange, N. J.

Application September 25, 1942, Serial No. 459,637

4 Claims. (Cl. 90—17)

This invention relates to new and useful improvements in a thread miller and is an improvement over my former Patent No. 1,974,084, granted Sept. 18, 1934.

In the machine disclosed in my former patent, the spindle of the milling cutter was supported in two spaced-apart bearings formed in a web extending laterally from a supporting block and was driven by a sprocket chain running over a sprocket wheel provided in the space between the two bearings. Because of the limited flexibility permitted by the chain and the limited space afforded between the bearings and the sprocket, the spindle could not be tilted to any great extent for angular adjustment of the milling cutter to produce right and left hand threads. Moreover, because of the overhanging bearing construction, considerable chattering and vibration would be set up through the spindle of the cutter during operation of the machine, especially when cutting relatively deep threads on hard metals which impaired the accuracy of the miller for the high precision work required and also impaired the smoothness of the milling surface.

It is therefore the primary object of the present invention to overcome the above disadvantages and to this end the invention consists in a thread milling machine in which the bearings for the spindle are centralized on the supporting block and the spindle driven from one end thereof, thereby permitting wider bearing surface which, under a heavy cut, will give more rigidity to the milling spindle, to minimize chattering and insure a smoother milling surface on the workpiece. Moreover, by driving the milling spindle from one end by means of a flexible belt or belts, the spindle may be tilted for a wider angular adjustment of the cutter and the belt pulleys may readily be changed for different driving speeds without requiring removal of the milling spindle from its support.

Another object of the present invention is to provide for minute angular adjustment of the spindle supporting block by mutually cooperating means on the stationary supporting bracket plate and on the turning block, respectively.

With the above and other objects in view which will appear as the description proceeds, my invention resides in any of the novel features of construction and operation hereinafter more fully set forth in the following description, illustrated in the accompanying drawings, and more particularly pointed out in the appended claims.

Referring to the drawings in which numerals of like character designate similar parts throughout the several views—

Figure 1:
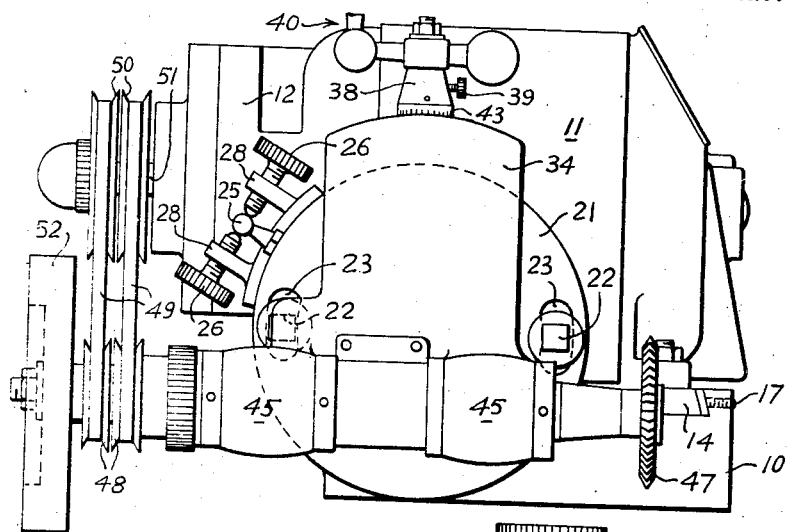
Fig. 1 is an end view of the improved thread miller assembly forming the subject of the present invention.
Figure 2:
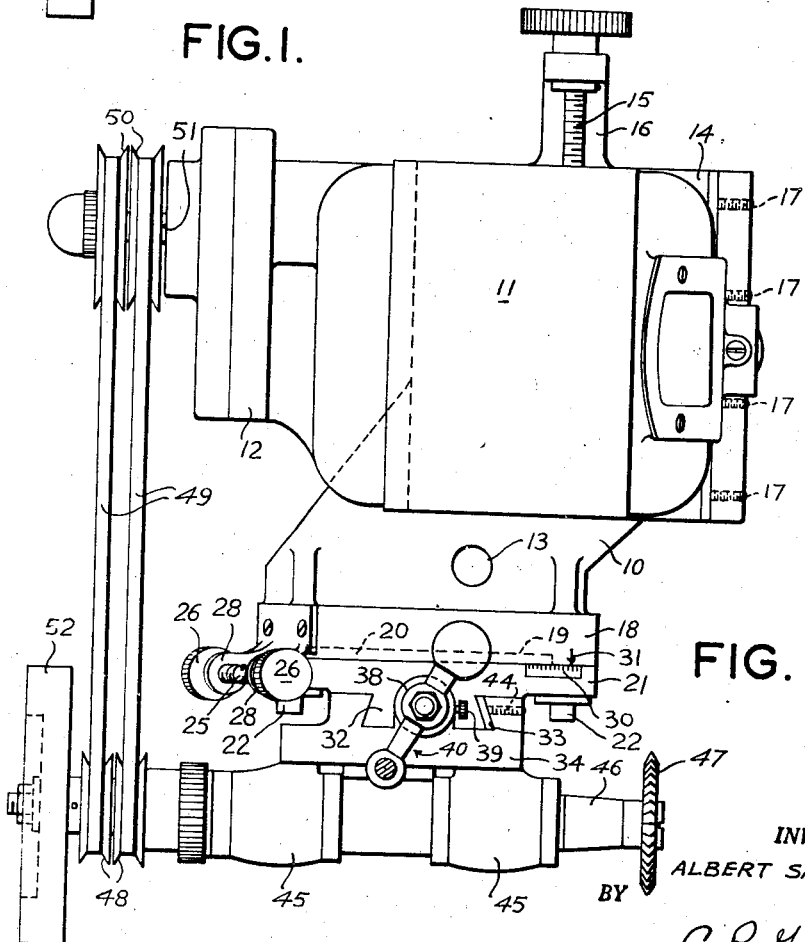
Fig. 2 is a top plan view of the same.
Figure 3:
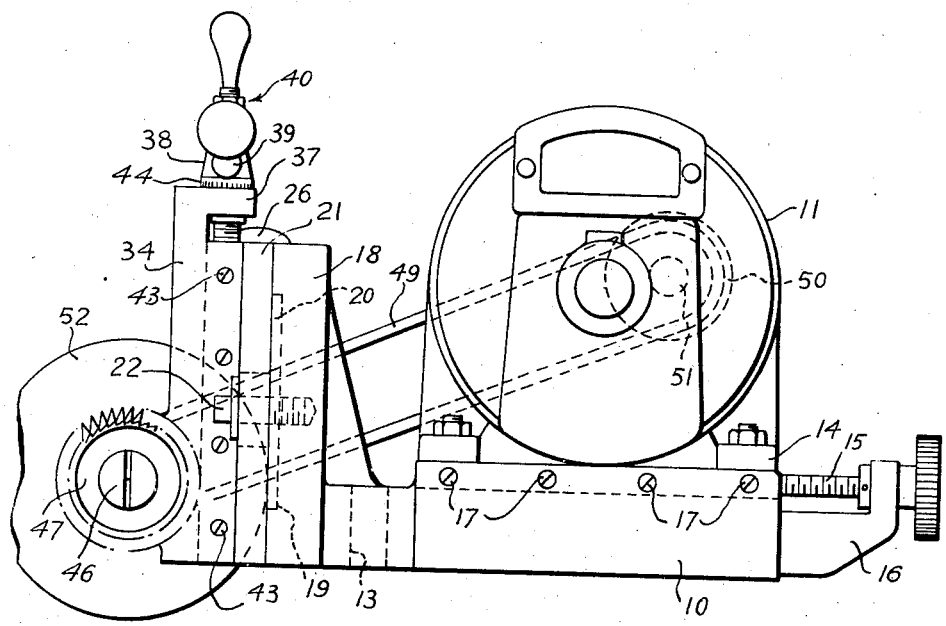
Fig. 3 is a view in side elevation of the improved thread miller assembly.

In the drawings, referring first to Figs. 1, 2 and 3 which show the complete assembly, 10 designates the horizontal base plate of the assembly on which is mounted an electric motor 11 provided with the usual gear reducing unit 12 and furnishing the motive power for the thread miller. The base plate 10 is provided with a drilled opening 13 intermediate its ends to receive a tie bolt or suitable fastening means to rigidly secure the assembly in proper position on the lathe compound (not shown). The base 14 of the motor 11 is dovetailed in the base plate 10 and is adapted to be moved longitudinally of the latter by means of an adjusting screw 15 in threaded engagement at one end with the motor base 14 and carried at its other end by an angular bracket arm 16 formed on the base plate 10. Set screws 17 threaded through one side of the base plate 10 and adapted to cooperate at their inner ends with the adjacent dovetailed edge of the motor base 14 serve to lock the motor 11 in any adjusted position.

Figure 4:
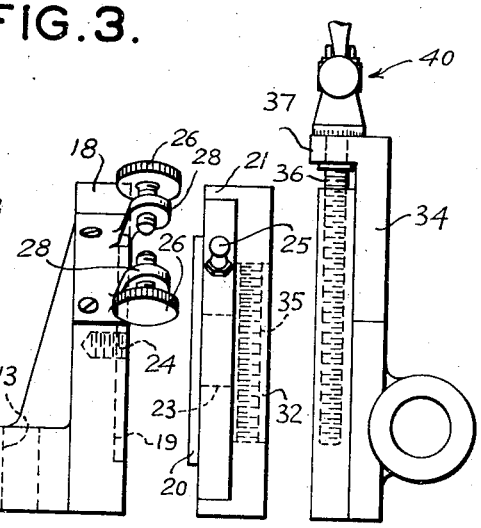
Fig. 4 is an exploded detail view of the milling spindle supporting head including the upstanding bracket formed on the base plate shown broken way, the intermediate turn block, and the vertically adjustable bearing block.
Figure 6:
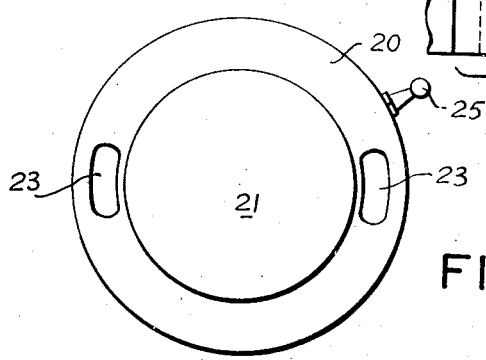
Fig. 6 is a similar view of the opposite face of the turn block for angular rotation on the stationary upstanding bracket of the base plate.

The horizontal base plate 10 terminates at one end in an upstanding bracket 18 provided on its outer face with a circular recess 19 to receive a complementary circular boss 20 on the adjacent face of a circular turn block 21, the latter being secured to the bracket 18 by means of transverse bolts 22 extending inwardly through arcuate slots 23 in the turn block and terminating in threaded engagement with the bracket for which purpose the bracket is provided with drilled openings 24 as clearly shown in Fig. 4. The turn block 21 is adapted to be rotated relative to the bracket 18 to the extent permitted by the arcuate slots 23 and for this purpose there is provided a spherical stud 25 projecting radially outwardly from the periphery of the turn block 21 and a pair of adjusting screws oppositely disposed with respect to each other and arranged on opposite sides, respectively, of the spherical stud, said adjusting screws being threaded into respective supporting lugs 29 secured to the periphery of the upstanding bracket 18 and extending angularly therefrom to overlie the periphery of the turn block on opposite sides of the spherical stud. Thus, by screwing one and correspondingly unscrewing the other of the adjusting screws in their respective lugs, the turn block 21 will be rotated in one direction and by reversing the operating movement of such adjusting screws, the turn block will be rotated in the opposite direction. Suitable calibrations 30 may be made on the turn block and a pointer 31 provided on the stationary bracket 18 as shown in Fig. 2 to indicate the degree of turning adjustment of the turn block.

On the face opposite the circular boss 20, the turn block 21 is provided with a dovetailed tenon 32 engaging in a complementary recess 33 in a bearing block 34 as clearly shown in Fig. 2. The bearing block 34 is vertically adjustable relative to the turn block 21 and for this purpose the dovetailed tenon 32 is provided centrally thereof with a longitudinally extending opening 35 (Figs. 4 and 5) threaded to receive the threaded end of a vertical adjusting bolt 36 rotatably supported adjacent its upper end in a boss 37 formed on the upper portion of the bearing block 34. Above the boss 37, the adjusting bolt 36 is surrounded by a thimble 38 which may be rigidly secured in circularly adjusted position on the bolt 36 by means of a set screw 39. The upper end of the adjusting bolt 36 is fitted with any suitable operating handle such as shown in the drawings and indicated generally as 40 for rotation in one direction to lower the bearing block 34 relative to turn block 21 or for rotation in the opposite direction to elevate the bearing block relative to the turn block.

Figure 5:
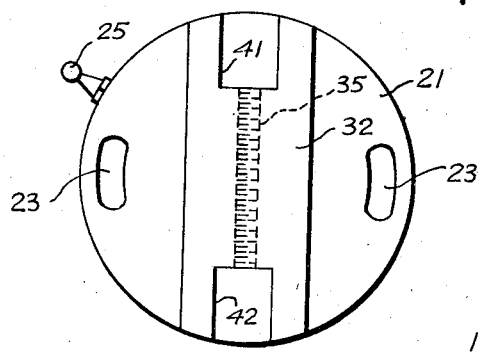
Fig. 5 is a detail plan view of one face of the intermediate turn block on which the bearing block is vertically adjustable.

In order to accommodate the boss 37 upon downward sliding movement of the bearing block 34, the upper portion of the tenon 32 on the turn block 21 is provided with a recess 41 as clearly shown in Fig. 5. A similar recess 42 is provided in the lower portion of the tenon 32 to accommodate any suitable lock nut (not shown) adapted to be secured to the lower end of the adjusting bolt 36 for limiting the extent of upward movement of the bearing block 34 relative to the turn block 21. Set screws 43 (Fig.3) threaded into one side of the bearing block and adapted to engage with the adjacent dovetailed edge of the tension 32 on the turn block 21 serve to lock the bearing block in any adjusted position. The degree of elevating and lowering movements of the bearing block 34 are readily ascertainable by means of calibrations 44 on the thimble 38 and a suitable index mark or pointer on the boss 37.

Adjacent its lower end, the bearing block 34 is formed with a pair of bearings 45 disposed on opposite sides, respectively, of the vertical center line of the block, said bearings supporting the milling spindle 46 which carries at one end the milling cutter 47 and carries at its opposite end pulley wheels 48 driven by flexible endless V-belts 49 trained thereover and running over pulley wheels 50 on the projecting shaft 51 of the gear reducing unit 12 of motor 11. Adjacent the belt drive, the spindle 46 is provided with a flywheel 52 operating to increase the power of the drive by kinetic energy developed during rotation of the spindle to provide for smoother milling operation and enable the use of a multiple-thread milling cutter, that is, one having a plurality of rows of cutting teeth cutting a corresponding number of threads simultaneously.

As heretofore pointed out, the thread miller assembly is adapted to be secured to the lathe compound, the vertical adjustment of the bearing block 34 enabling the miller cutter 47 to be properly positioned relative to the rotating workpiece held by the conventional tailstock and chuck of the lathe, and the rotatable adjustment of the turn block 21 adjusting the milling cutter to the proper inclination relative to the perpendicular for the desired helix angle in the threads to be produced. Due to their flexibility and twisting ability, the belts of the belt drive will permit the angular adjustment of the turn block through a relatively wide arc and as the motor is adjustable on the horizontal base plate 10, any slack created in the belts of the belt drive due to wear or to vertical or angular adjustments of the blocks 34 and 21, respectively, can be taken up to prevent slippage by simple adjustment of the motor on the base plate. By driving the milling spindle from one end thereof instead of intermediate its ends as heretofore, the belt pulleys may be changed for different speeds of milling spindle without requiring removal of the spindle from its bearings, such speed changes being necessary to obtain smooth milling surfaces on work pieces of different metals.

It will be seen that as the bearing block 34 is vertically adjustable on the turn block 21 and the latter angularly adjustable on the stationary supporting bracket 18 of the horizontal base plate 10, a greater bearing surface for the assembly is afforded on the lathe compound than in the assembly of my former patent for the reason that in the present machine only the bearing block 34 need project beyond the edge of the lathe compound whereas in the former assembly inasmuch as the bearing block was angularly adjustable on a block which was vertically adjustable on the stationary upstanding supporting bracket at one end of the base plate, both of the adjustable blocks had to extend beyond the edge of the lathe compound to permit the necessary freedom for vertical movement. Thus, with the larger bearing surface, the assembly is held more firmly in place on the lathe compound and the likelihood of chattering and vibration is reduced to a minimum.

It will be noted further that inasmuch as the bearings for the milling spindle are cast directly on the front face of the bearing block and such spindle driven from one end thereof instead of between the bearings, a wider bearing surface is provided for the spindle which will insure a smoother milling surface on the work-piece by minimizing chattering of the spindle and cutter carried thereby.

From the foregoing it is believed that the construction and advantages of my improved thread miller assembly will be readily understood by those skilled in the art without further description, it being borne in mind that numerous changes may be made in the details disclosed without departing from the spirit of the invention as set out in the following claims.

What I claim is:

1. In a thread milling assembly of the class described including a power-driven spindle carrying a milling cutter at one end for milling threads on a work-piece held in a lathe, means supporting said spindle for vertical and angular adjustments of the milling cutter relative to the work-piece, comprising a horizontal base plate adapted to be secured to the lathe compound and terminating at one end in a vertical bracket, a disc-like turn block mounted for limited circular movement on the outer face of said bracket in parallel relation with the latter, mutually cooperating means on said bracket and block, respectively, operable to turn said block in either direction relative to said bracket, a bearing block parallel to said turn block and dovetailed to the outer face of the latter for vertical movement, a vertical adjusting screw carried by said bearing block and in threaded engagement with said turn block operable to raise and lower said bearing block relative to said turn block, and a pair of bearings integral with said bearing block on the outer face of the latter and disposed on opposite sides, respectively, of the vertical center line of the block, rotatably supporting the spindle intermediate the ends of the latter.

2. A thread milling assembly for attachment to a lathe compound, comprising a horizontal supporting base plate terminating at one end in an upright bracket, a disc-like turn block mounted for limited turning movement on the outer face of said bracket in parallel relation with the latter, mutually cooperating means on said bracket and block, respectively, operable to turn said block in either direction relative to said bracket, a bearing block dovetailed to the outer face of said turn block for vertical movement, a vertical adjusting screw carried by said bearing block and in threaded engagement with said turn block operable to raise and lower said bearing block relative to said turn block, a pair of bearings formed on the outer face of said bearing block on opposite sides, respectively, of the vertical center line of the latter, a spindle rotatably supported intermediate its ends in said bearings and projecting beyond the sides of said bearing block, a milling cutter secured to one end of said spindle, a motor mounted on said horizontal supporting base plate for movement towards and away from said spindle, a belt and pulley drive from said motor to said spindle adjacent the end of the latter opposite to the milling cutter, and a flywheel on said spindle adjacent said belt and pulley drive.

3. A thread milling assembly for attachment to a lathe compound, comprising a horizontal supporting base plate terminating at one end in an upright bracket formed with a circular recess in its outer face, a turn block mounted on the outer face of said bracket for limited angular movement and having a circular boss on its inner face engaging in the recess of said bracket to guide said turn block in its angular movement, mutually cooperating means on said bracket and turn block, respectively, operable to impart angular movement to said turn block in either direction and maintain said block in any adjusted position, a bearing block dovetailed to the outer face of said turn block for movement relative to the latter along a line bisecting the arc defined by the extent of turning movement of the turn block, the tenon of the dovetailed joint being formed on the outer face of said turn block and having a threaded central opening extending longitudinally thereof, a hand-operated adjusting screw carried by said bearing block and in threaded engagement with said threaded opening to raise and lower said bearing block relative to said turn block, a pair of bearings formed on the outer face of said bearing block on opposite sides, respectively, of the vertical center line of the latter, a spindle supported intermediate its ends in said bearings, a milling cutter on one end of said spindle, a flywheel on the other end of said spindle, a motor movably mounted on said supporting base plate for adjustment towards and away from said spindle, and a belt and pulley drive from said motor to said spindle adjacent the flywheel end of the latter.

4. A thread milling assembly for attachment to a lathe compound including a horizontal base member, a bracket member extending upwardly from said base member adjacent one end of the latter and having a circular recess in its outer face, a turn block mounted for turning movement on the outer face of said bracket member and formed with a circular boss on its inner face engaging in the recess of said bracket member to guide said turn block in its turning movement, mutually cooperating means on said bracket member and turn block, respectively, operable to impart turning movement to said turn block in either direction and maintain said turn block in any adjusted position, a dovetailed tenon formed on the outer face of said turn block, a bearing block mounted on said turn block and having a complementary recess on its inner surface to receive the dovetailed tenon on the adjacent outer face of said turn block to form a dovetailed joint, mutually cooperating means on said turn block and bearing block, respectively, operable to move said bearing block relative to said turn block longitudinally of said dovetailed joint, bearing means carried on the outer face of said turn block extending substantially on opposite sides of the center line of the latter, a power driven spindle rotatably supported in said bearing means, and a milling cutter on one end of said spindle.

ALBERT SAROSSY.